(12) United States Patent
Miyazaki et al.

(10) Patent No.: US 10,101,605 B2
(45) Date of Patent: Oct. 16, 2018

(54) DISPLAY DEVICE AND MANUFACTURING METHOD OF THE SAME

(71) Applicant: Japan Display Inc., Minato-ku (JP)

(72) Inventors: Kayoko Miyazaki, Tokyo (JP); Keiji Tago, Tokyo (JP); Hirokazu Morimoto, Tokyo (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

(21) Appl. No.: 15/403,548

(22) Filed: Jan. 11, 2017

(65) Prior Publication Data

US 2017/0123261 A1    May 4, 2017

Related U.S. Application Data

(63) Continuation of application No. 14/483,763, filed on Sep. 11, 2014, now Pat. No. 9,581,857.

(30) Foreign Application Priority Data

Sep. 12, 2013  (JP) .................................. 2013-189316
Jul. 8, 2014   (JP) .................................. 2014-140458

(51) Int. Cl.
  *G02F 1/1333*    (2006.01)
  *G02F 1/1335*    (2006.01)
  (Continued)

(52) U.S. Cl.
  CPC ...... *G02F 1/133308* (2013.01); *G02F 1/1368* (2013.01); *G02F 1/13338* (2013.01);
  (Continued)

(58) Field of Classification Search
  CPC .. G02F 1/133308; G02F 3/044; G02F 1/1368; G02F 1/13338; G02F 1/133528;
  (Continued)

(56) References Cited

U.S. PATENT DOCUMENTS

2001/0012084 A1   8/2001  Ohta
2002/0054261 A1   5/2002  Sekiguchi
(Continued)

FOREIGN PATENT DOCUMENTS

JP   2006-251294      9/2006
JP   2009-075217 A    4/2009
(Continued)

OTHER PUBLICATIONS

Office Action dated Feb. 20, 2018 in Japanese Patent Application No. 2014-140458 with English translation, 11pages.
(Continued)

*Primary Examiner* — Kevin Quarterman
(74) *Attorney, Agent, or Firm* — Oblon, McClelland, Maier & Neustadt, L.L.P.

(57) ABSTRACT

According to one embodiment, a display device includes a display panel configured to hold a liquid crystal layer between a first substrate and a second substrate, a cover member positioned at a side of the second substrate of the display panel, a first optical element positioned at an outer surface side of the first substrate, and a second optical element positioned between the second substrate and the cover member, bonded to an inner surface of the cover member but not bonded to the second substrate.

11 Claims, 9 Drawing Sheets

(51) Int. Cl.
*G02F 1/13363* (2006.01)
*G02F 1/1368* (2006.01)
*G06F 3/044* (2006.01)

(52) U.S. Cl.
CPC .... *G02F 1/13363* (2013.01); *G02F 1/133528* (2013.01); *G06F 3/044* (2013.01); *G02F 2001/133325* (2013.01); *G02F 2001/133331* (2013.01)

(58) Field of Classification Search
CPC ..... G02F 1/13363; G02F 2001/133331; G02F 2001/133325
See application file for complete search history.

(56) References Cited

U.S. PATENT DOCUMENTS

| | | |
|---|---|---|
| 2007/0177071 A1 | 8/2007 | Egi |
| 2011/0310470 A1* | 12/2011 | Horie ................ G02F 1/133502 359/352 |
| 2012/0057107 A1 | 3/2012 | Kitagawa |
| 2012/0200812 A1 | 8/2012 | Qi |
| 2012/0206680 A1 | 8/2012 | Onishi |
| 2012/0223877 A1 | 9/2012 | Cho |
| 2013/0033659 A1 | 2/2013 | Chung |
| 2013/0033662 A1 | 2/2013 | Chung |
| 2013/0063684 A1 | 3/2013 | Chen |
| 2013/0070000 A1 | 3/2013 | Yoshida |
| 2014/0078415 A1* | 3/2014 | Tanabe ................ G02F 1/13338 349/12 |
| 2014/0232953 A1 | 8/2014 | Tago |
| 2014/0253843 A1 | 9/2014 | Kanno |
| 2014/0340599 A1 | 11/2014 | Rawer |
| 2014/0368749 A1* | 12/2014 | Alonso ............... G02F 1/13338 349/12 |

FOREIGN PATENT DOCUMENTS

| | | |
|---|---|---|
| JP | 2010-79087 | 4/2010 |
| JP | 2010-237354 | 10/2010 |
| JP | 2013-54124 | 3/2013 |
| WO | WO 2013/011781 A1 | 1/2013 |

OTHER PUBLICATIONS

Office Action dated Jun. 19, 2018, in Japanese Patent Application No. 2014-140458, filed Jul. 8, 2014, with English-language Translation, citing document AO.

* cited by examiner

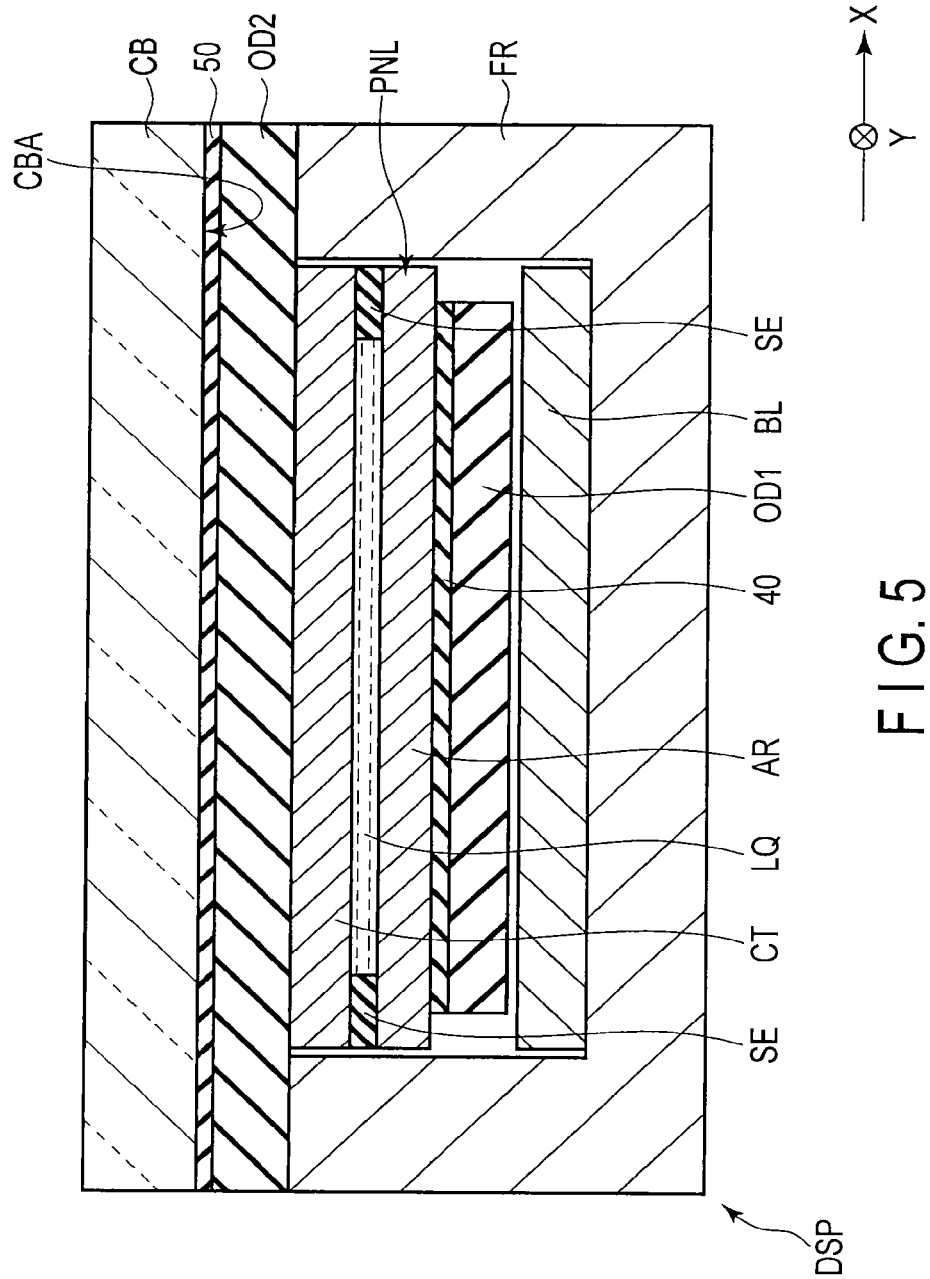
F I G. 5

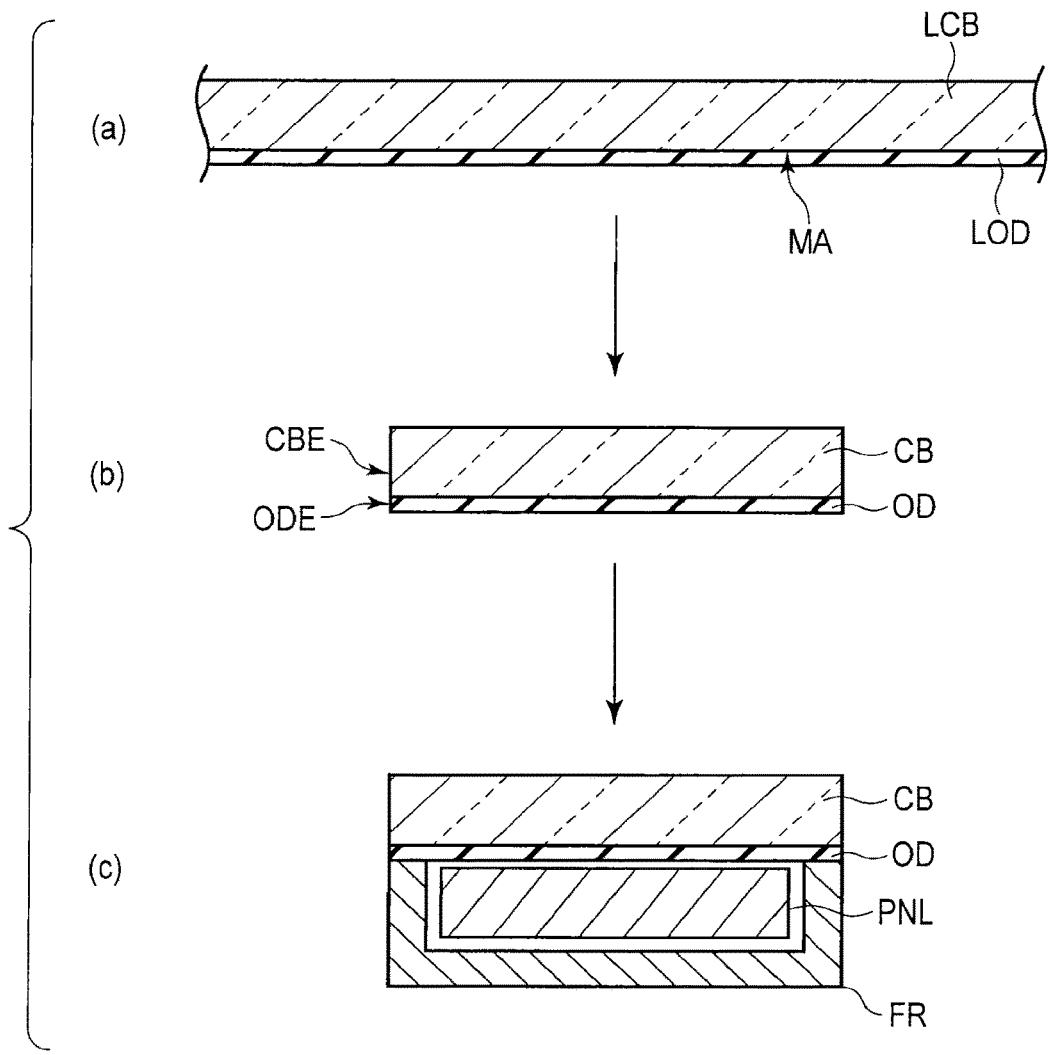
F I G. 6

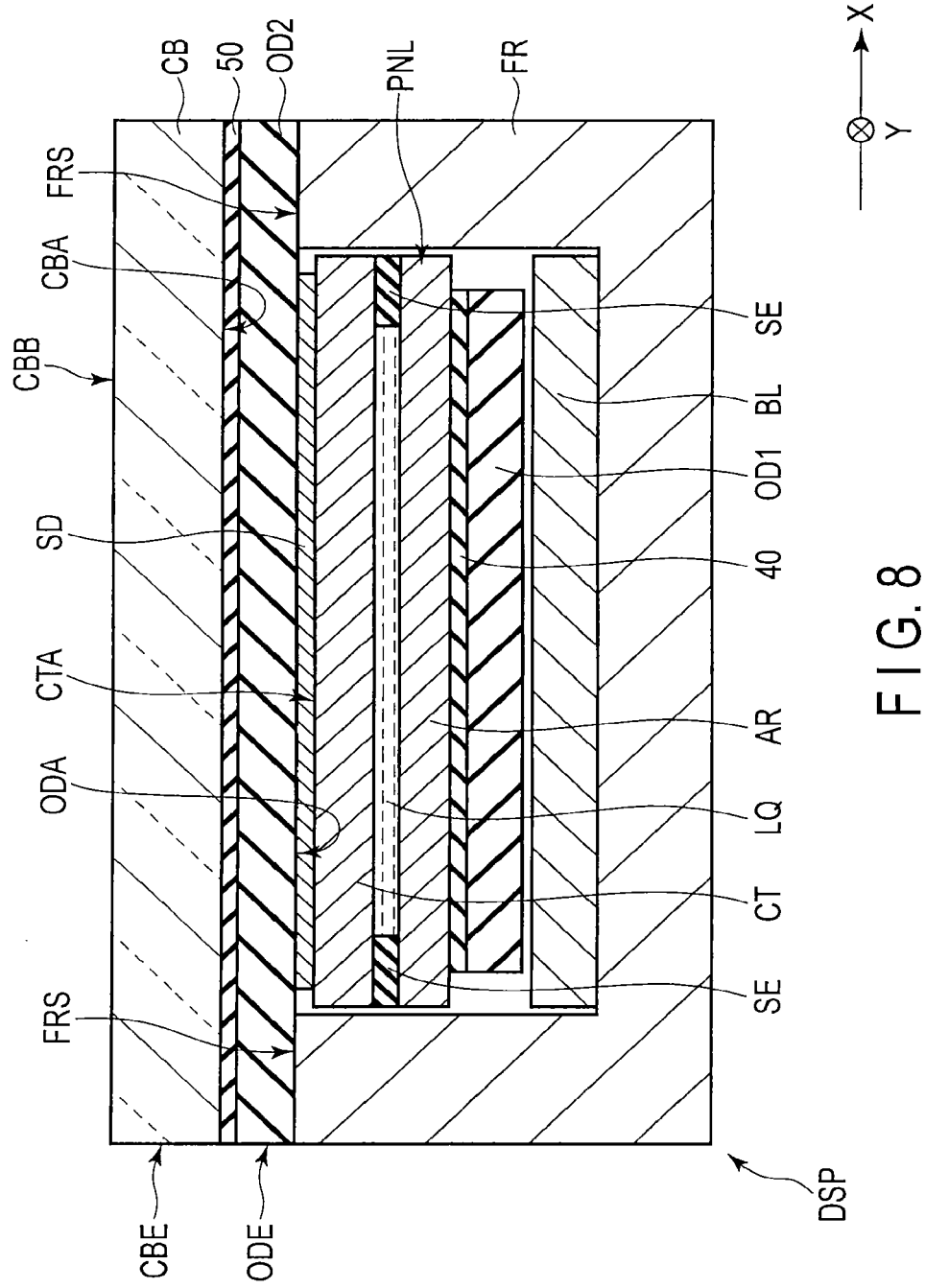
F I G. 8

DISPLAY DEVICE AND MANUFACTURING METHOD OF THE SAME

CROSS-REFERENCE TO RELATED APPLICATIONS

This application is a continuation of U.S. application Ser. No. 14/483,763 filed Sep. 11, 2014, and is based upon and claims the benefit of priority from Japanese Patent Applications No. 2013-189316, filed Sep. 12, 2013; and No. 2014-140458, filed Jul. 8, 2014, the entire contents of all of which are incorporated herein by reference.

FIELD

Embodiments described herein relate generally to a display device and a manufacturing method of the same.

BACKGROUND

Flat-panel display devices such as liquid crystal display devices and organic electroluminescent (EL) display devices have been utilized in various fields. Recently, a display device having a protective plate bonded to a display surface of a display panel has been in practical use. As an example of the liquid crystal display device, a display device having a structure in which a polarizer is bonded to a display surface side of the display panel, and the display panel and the protective plate are bonded to each other via a resin layer has been proposed. However, when the display panel and the protective plate are bonded to each other, a foreign substance is often deposited on the resin layer or air bubbles are often mixed into the resin layer, which may cause lowering of yields.

Thus, a display element which comprises a transparent protective plate having an optical film applied onto a region corresponding to a display area, a display panel arranged to allow the optical film to intervene between the transparent protective plate and the display panel, and a resin layer formed in the region corresponding to the display area, between the optical film and the display panel, has been proposed.

BRIEF DESCRIPTION OF THE DRAWINGS

FIG. 5 is a cross-sectional view schematically showing another structural example of the display device DSP comprising the display panel PNL shown in FIG. 1.

FIG. 6 is an illustration showing an example of a method of manufacturing the display device DSP.

FIG. 8 is a cross-sectional view schematically showing yet another structural example of the display device DSP comprising the display panel PNL shown in FIG. 1.

DETAILED DESCRIPTION

Figure 1:
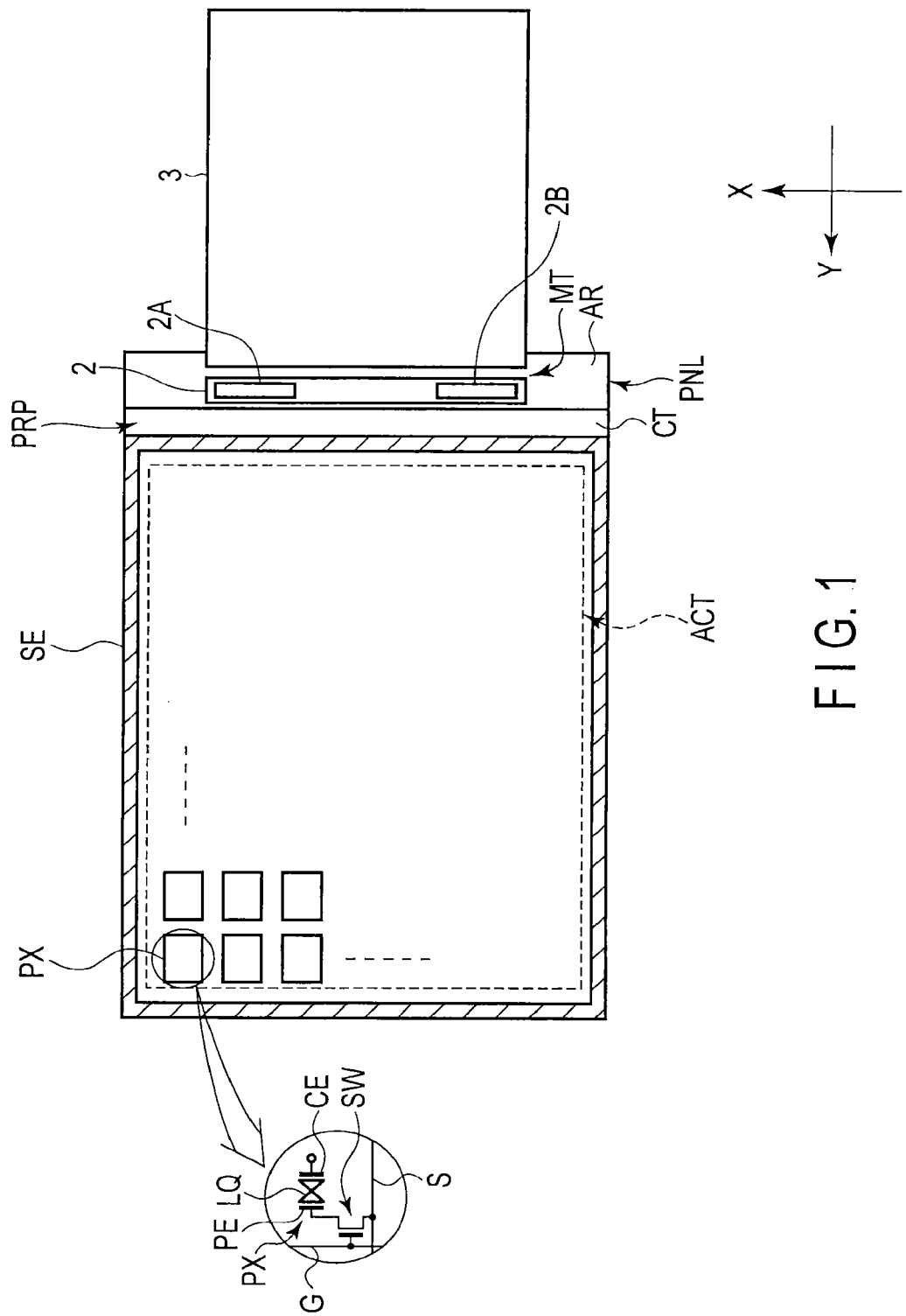
FIG. 1 is a plan view schematically showing an example of a display panel PNL applicable to a display device according to one of the embodiments.

In general, according to one embodiment, there is provided a display device comprising a display panel configured to hold a liquid crystal layer between a first substrate and a second substrate, a cover member positioned at the second substrate side of the display panel, a first optical element positioned at an outer surface side of the first substrate, and a second optical element positioned between the second substrate and the cover member, bonded to an inner surface of the cover member but not bonded on the second substrate.

According to another embodiment, there is provided a display device comprising a display panel, a cover member positioned at a front surface side of the display panel, and an optical element positioned between the display panel and the cover member, bonded to an inner surface of the cover member but not bonded to the display panel, being larger than outer dimensions of the display panel, and opposed to an entire surface of the display panel.

According to another embodiment, there is provided a method of manufacturing a display device, comprising bonding an optical element to one of main surfaces of a cover member, cutting the cover member and the optical element wholly so as to have a size greater than outer dimensions of a display panel, containing the display panel in a casing, and fixing the optical element or the cover member at the casing so as to have the optical element opposed to an entire surface of the display panel without bonding the optical element on the display panel.

The embodiments will be hereinafter described with reference to the accompanying drawings. In the drawings, constituent elements having like or similar functions are denoted by the same reference numbers and their duplicated explanation is omitted.

FIG. 1 is a plan view schematically showing an example of a display panel PNL applicable to a display device of the embodiments. A liquid crystal display device will be described here as an example of the display device.

The display panel PNL is an active matrix type liquid crystal display panel, comprising an array substrate AR, a counter-substrate CT opposed to the array substrate AR, and a liquid crystal layer LQ held between the array substrate AR and the counter-substrate CT. The array substrate AR and the counter-substrate CT are applied to each other by a sealing member SE while forming a predetermined cell gap therebetween. In the example shown in the figure, the sealing member SE is formed to be shaped in a closed loop of a rectangular frame. The cell gap is formed by a columnar spacer formed on the array substrate AR or the counter-substrate CT. The liquid crystal layer LQ is held at an inner side surrounded by the sealing member SE, in the cell gap between the array substrate AR and the counter-substrate CT. The display panel PNL comprises an active area ACT on which an image is displayed, at the inner side surrounded by the sealing member SE. The active area ACT is formed in, for example, an approximately rectangular shape, and is constituted by a plurality of pixels PX arrayed in a matrix.

The array substrate AR comprises gate lines G which extend in a first direction X, source lines S which extend in a second direction Y crossing the first direction X and which cross the gate lines G, switching elements SW connected to the gate lines G and the source lines S, the pixel electrodes PE connected to the switching elements SW, and so on. A common electrode CE opposed to each of the pixel electrodes PE is provided on, for example, the counter-substrate CT, but may be provided on the array substrate AR.

Explanation of a detailed structure of the display panel PNL is omitted here, but the structure is applicable in modes largely utilizing a vertical electric field such as Twisted Nematic (TN) mode, Optically Compensated Bend (OCB) mode and Vertical Aligned (VA) mode, and modes largely utilizing a lateral electric field such as In-Plane Switching (IPS) mode and Fringe Field Switching (FFS) mode. In the structure of the mode utilizing the vertical electric field, the pixel electrode PE is provided on the array substrate AR while the common electrode CE is provided on the counter-substrate CT. In the structure of the mode utilizing the lateral electric field, both the pixel electrode PE and the common electrode CE are provided on the array substrate AR.

In the example shown in the figure, the array substrate AR comprises a mounting portion MT extending to an outer side than a substrate end portion of the counter-substrate CT. Signal supply sources configured to supply a signal necessary to drive the display panel PNL, such as a driving IC chip 2 and a flexible printed circuit (FPC) board 3, are positioned in a peripheral area PRP at a side outer than the active area ACT, and are mounted on a mounting portion MT. The peripheral area PRP is an area surrounding the active area ACT, includes the area in which the sealing member SE is arranged, and is shaped in a rectangular frame. The display panel PNL shown in the figure is formed on narrower frame specification of having an extremely narrow frame width, and the sealing member SE extends to an end portion of the display panel PNL.

The driving IC chip 2 comprises an image signal writing circuit 2A configured to execute necessary control to write an image signal in the pixel electrode PE of each pixel PX in the image display mode of displaying an image on the active area ACT. The driving IC chip 2 may comprise a detecting circuit 2B configured to detect variation in electrostatic capacitance of a sensing element in a sensing mode of detecting contact or approach of a substance on a detecting surface, besides the image signal writing circuit 2A. The sensing element is constituted by, for example, the common electrode CE and the source line S each extending via an insulator. The sensing element may be constituted by using the electrodes in the active area, besides the line, or may be constituted by arranging the detecting electrode or the detecting line, irrespective of the combination of the common electrode CE and the source line S. In addition, the sensing element may be constituted by the detecting electrode or the detecting line positioned outside the display panel PNL.

Figure 2:
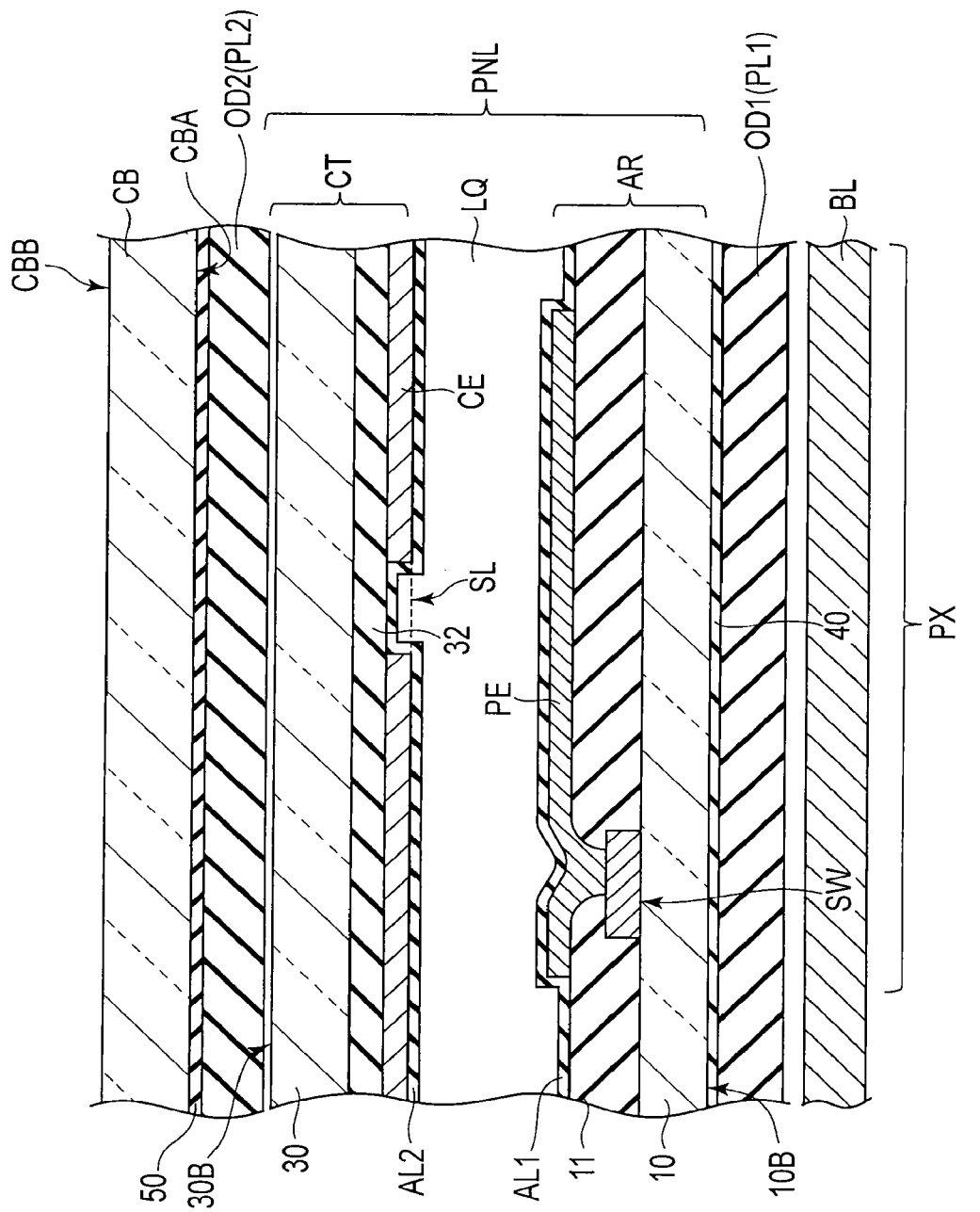
FIG. 2 is a cross-sectional view schematically showing a structural example of the display panel PNL shown in FIG. 1.

FIG. 2 is a cross-sectional view schematically showing a structural example of the display panel PNL shown in FIG. 1. The display panel PNL of a VA mode will be hereinafter exemplified.

The array substrate AR is formed by using a first insulation substrate 10 which is transparent, such as a glass substrate and a resin substrate. The array substrate AR comprises the switching element SW, the pixel electrode PE, a first alignment film AL1, and so on, at a side opposed to the counter-substrate CT of the first insulation substrate 10. The switching element SW is constituted by, for example, a thin film transistor (TFT) though not described in detail. The switching element SW is covered with an interlayer insulation film 11. The pixel electrode PE is formed on the interlayer insulation film 11. The pixel electrode PE is formed of, for example, a conductive material having light transmissivity, such as indium tin oxide (ITO) and indium zinc oxide (IZO). The pixel electrode PE and the interlayer insulation film 11 are covered with the first alignment film AL1. The first alignment film AL1 is formed of a material having a vertical alignment property.

On the other hand, the counter-substrate CT is formed by using a second insulation substrate 30 which is transparent, such as a glass substrate and a resin substrate. The counter-substrate CT comprises a color filter layer 32, a common electrode CE, a second alignment film AL2, and so on, at a side opposed to the array substrate AR of the second insulation substrate 30. The counter-substrate CT may further comprise a black matrix, a transparent overcoat layer, and so on though not shown in the figure. The black matrix is formed at, for example, a position opposed to wiring portions such as the gate lines, the source lines and the switching elements. The overcoat layer is arranged at a side opposed to the array substrate AR of the color filter layer 32, to smooth unevenness on the color filter layer 32 and so on. The color filter layer 32 is formed of resin materials colored in red, green, blue, and so on, respectively. The common electrode CE is formed at a side opposed to the array substrate AR of the color filter layer 32. The common electrode CE is formed of, for example, a conductive material having light transmissivity, such as ITO and IZO. On the common electrode CE, an alignment control structure (for example, a slit SL) is formed at a position opposed to the pixel electrode PE to form a plurality of domains in the single pixel PX. The common electrode CE is covered with the second alignment film AL2. The second alignment film AL2 is formed of a material having a vertical alignment property.

The array substrate AR and the counter-substrate CT as described above are arranged such that the first alignment film AL1 and the second alignment film AL2 are opposed to each other. At this time, the predetermined cell gap is formed between the first alignment film AL1 of the array substrate AR and the second alignment film AL2 of the counter-substrate CT, by the spacer. The liquid crystal layer LQ is sealed in the cell gap.

A backlight unit BL is arranged at a rear surface side of the display panel PNL, i.e., a side opposed to the array substrate AR. Various types of the backlight unit BL are applicable. In addition, the backlight unit BL using a light emitting diode or a cold-cathode tube as a light source can be applied. The backlight unit BL comprises a diffusion film or a brightness enhancement film as needed. Explanation of a detailed structure of the backlight unit BL is omitted here.

A cover member CB is arranged at a front surface side of the display panel PNL, i.e., a side opposed to the counter-substrate CT. The cover member CB is transparent and is formed of, for example, tempered glass, and may also be called an ornamental plate, cover glass, or a front plate. An outer surface CBB of the cover member CB is the detecting surface or a display surface. The cover member CB is formed to be comparatively thick, and has a thickness ranging, for example, 0.3 mm to 0.5 mm.

A first optical element OD1 is arranged between the display panel PNL and the backlight unit BL. The first optical element OD1 includes a first polarizer PL1. A second optical element OD2 is arranged between the display panel PNL (or the counter-substrate CT) and the cover member CB. The second optical element OD2 includes a second polarizer PL2. At least one of the first optical element OD1 and the second optical element OD2 may include a retardation film.

The first optical element OD1 is bonded to, for example, an outer surface of the array substrate AR, i.e., an outer surface 10B of the first insulation substrate 10 opposed to the backlight unit BL, by an adhesive 40. The second optical element OD2 is bonded to an inner surface CBA, i.e., a side opposed to the display panel PNL, of the cover member CB, by an adhesive 50. The second optical element OD2 is not bonded to the display panel PNL. In other words, the second optical element OD2 is not bonded to the counter-substrate CT facing the second optical element OD2.

Figure 3:
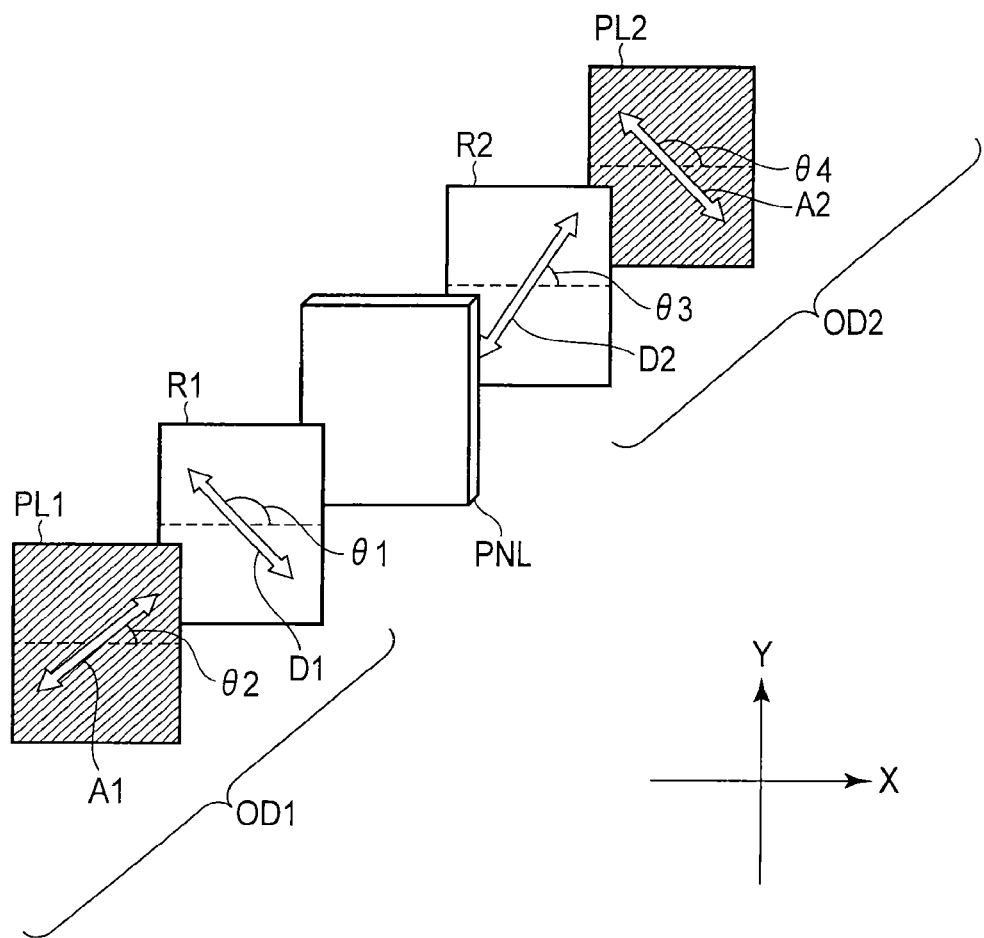
FIG. 3 is an illustration showing structural examples of the first optical element OD1 and the second optical element OD2 shown in FIG. 2.

FIG. 3 is an illustration showing structural examples of the first optical element OD1 and the second optical element OD2 shown in FIG. 2. Structures necessary for explanations alone are shown in the figure. In addition, a direction parallel to a shorter side of the display panel PNL is defined as a first direction X and a direction parallel to a longer side of the display panel PNL is defined as a second direction Y. The first direction X is perpendicular to the second direction Y.

The first optical element OD1 positioned at a rear surface side of the display panel PNL includes, for example, a first polarizer PL1 and a first retardation film R1. The first retardation film R1 is, for example, a ¼-wavelength plate and has a slow axis D1. The slow axis D1 crosses the first direction X at an angle θ1 formed therebetween. The first polarizer PL1 has an absorption axis A1. The absorption axis A1 crosses the first direction X at an angle θ2 formed therebetween.

The second optical element OD2 positioned at a front surface side of the display panel PNL includes, for example, a second polarizer PL2 and a second retardation film R2. The second retardation film R2 is, for example, a ¼-wavelength plate and has a slow axis D2. The slow axis D2 crosses the first direction X at an angle θ3 formed therebetween. The second polarizer PL2 has an absorption axis A2. The absorption axis A2 crosses the first direction X at an angle θ4 formed therebetween.

An example of an axial structure application to the VA mode will be hereinafter described. The formed angle θ1 is 161 degrees, the formed angle θ2 is 26 degrees, and the slow axis D1 and the absorption axis A1 cross at 45 degrees in a plane X-Y. The formed angle θ3 is 71 degrees, the formed angle θ4 is 116 degrees, and the slow axis D2 and the absorption axis A2 cross at 45 degrees in the plane X-Y. In addition, the absorption axis A1 is perpendicular to the absorption axis A2, and the slow axis D1 is perpendicular to the slow axis D2. Each of the first retardation film R1 and the second retardation film R2 is a biaxial retardation film has an Nz coefficient of approximately 1.6.

The rear surface side and the front surface side may be exchanged in the above-described axial structure.

In the display panel PNL, for example, a cell gap is 3 μm, a refractive index anisotropy Δn of the liquid crystal layer LQ is 0.1, and the liquid crystal molecules are vertically aligned.

Figure 4:
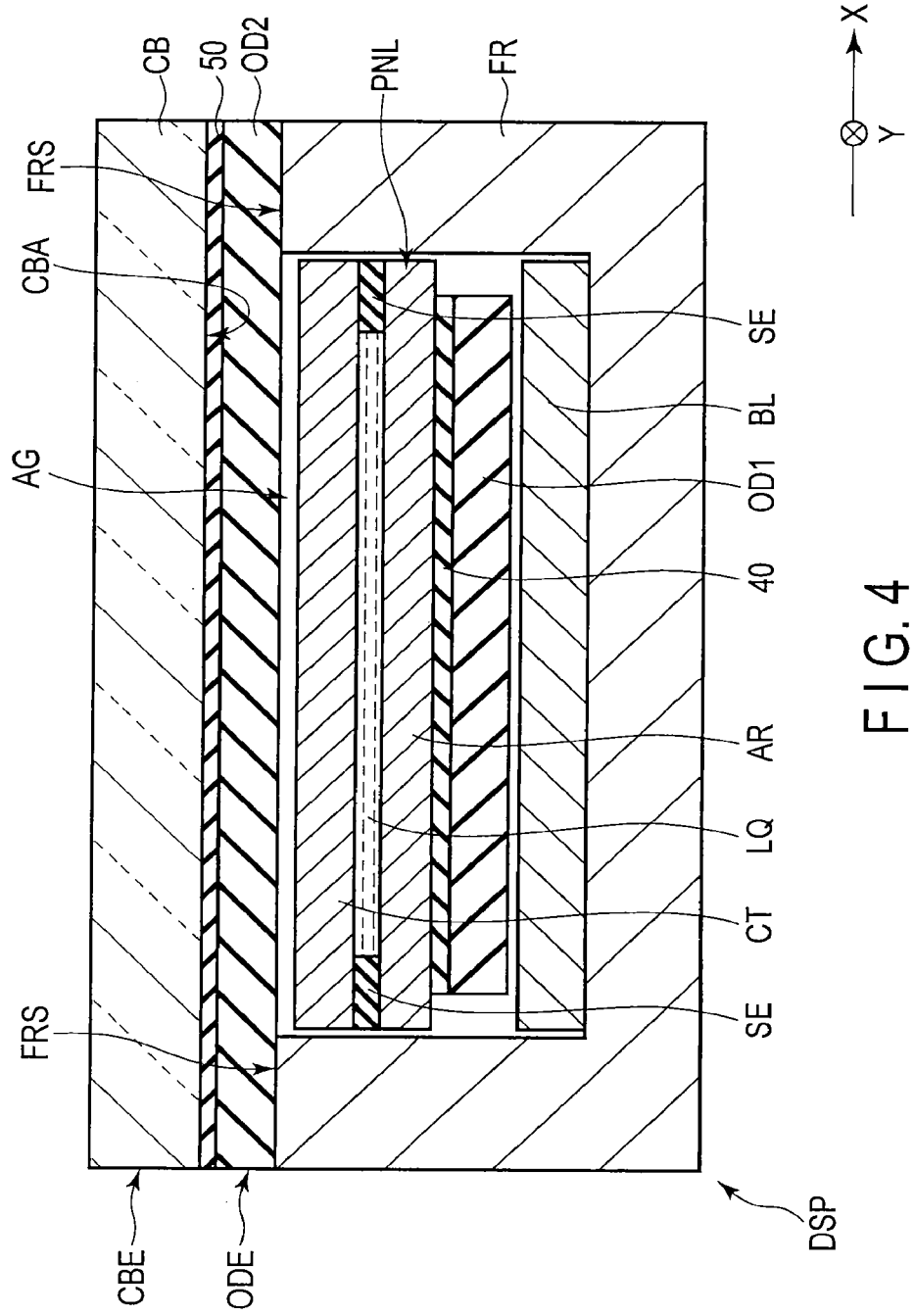
FIG. 4 is a cross-sectional view schematically showing a structural example of a display device DSP comprising the display panel PNL shown in FIG. 1.

FIG. 4 is a cross-sectional view schematically showing a structural example of a display device DSP comprising the display panel PNL shown in FIG. 1.

The display device DSP comprises a casing FR containing the backlight unit BL and the display panel PNL. The cover member CB or the second optical element OD2 is fixed to the casing FR in manners such as adhesion, swaging, screwing and fitting. In the example shown in the figure, the casing FR has a support surface FRS supporting the cover member CB arranged integrally with the second optical element OD2. The support surface FRS supports the second optical element OD2. For example, the second optical element OD2 is bonded to the support surface FRS.

The display panel PNL holds the liquid crystal layer LQ between the array substrate AR and the counter-substrate CT bonded to each other by the sealing member SE.

As described above, the first optical element OD1 is bonded to the rear surface side of the display panel PNL by the adhesive 40. The second optical element OD2 is bonded to the inner surface CBA of the cover member CB by the adhesive 50. The second optical element OD2 extends over a substantially entire surface of the inner surface CBA. In other words, an outer edge CBE of the cover member CB overlaps an outer edge ODE of the second optical element OD2.

The cover member CB and the second optical element OD2 are formed to be larger than outer dimensions of the display panel PNL, and extend outwardly from both end portions of the display panel PNL in not only the first direction X shown in the figure, but also the second direction Y. In other words, the second optical element OD2 is opposed to the entire surface of the display panel PNL.

In the example shown in the figure, the second optical element OD2 is separated from the display panel PNL. In other words, an air gap (or an air layer) AG is formed between the second optical element OD2 and the display panel PNL (or the counter-substrate CT). As an example, the air gap AG ranges from 0.2 to approximately 0.5 mm.

According to the present embodiment, since the second optical element OD2 is bonded to the inner surface CBA of the cover member CB positioned at the front surface side of the display panel PNL and the second optical element OD2 is free from the display panel PNL, a rework operation of bonding the second optical element OD2 again can be executed without damaging the display panel PNL even if inconvenience occurs at the second optical element OD2 in the manufacturing process. For this reason, efficiency of the rework operation for the module at which the inconvenience occurs can be improved, and breakage of the expensive display panel PNL at the rework operation can be prevented. Lowering of the manufacturing yields can be therefore suppressed.

In particular, in the display device of the comparative example in which the cover member CB and the display panel PNL are bonded to each other, the entire body of the second optical element OD2 positioned between the cover member CB and the display panel PNL is substantially covered with adhesive resin. In this structure, peeling off the second optical element OD2 and the display panel PNL is difficult when the rework operation needs to be executed. In addition, when the second optical element OD2 is peeled off, the display panel PNL may be broken, which causes the yields to be lowered. Furthermore, some ingredients of the adhesive resin (for example, ultraviolet curing resin) covering the second optical element OD2 may penetrate from the end portions and surfaces of the second polarizer PL2, the second retardation film R2, and so on and damage the second polarizer PL2 or the second retardation film R2.

In the present embodiment, however, since the second optical element OD2 is not bonded to the display panel PNL, the second optical element OD2 does not need to be peeled off from the display panel PNL at the rework operation. In addition, since the second optical element OD2 is not covered with the adhesive resin, the optical performance can be maintained without undesired penetration of the ingredients of the adhesive resin. Furthermore, since the adhesive resin bonding the cover member CB and the display panel PNL to each other is unnecessary, foreign substances or air bubbles are not mixed with the adhesive resin, and occurrence of inconvenience in the manufacturing process can be suppressed.

In addition, since the second optical element OD2 is bonded to the comparatively thick cover member CB, deformation such as expansion and shrinkage, of the second optical element OD2, can be suppressed, and deformation of the display panel PNL resulting from stress of the second optical element OD2 can be suppressed.

Furthermore, the second optical element OD2 extends over the entire inner surface CBA of the cover member CB, is larger than the outer dimensions of the display panel PNL and is opposed to the entire surface of the display panel PNL. For this reason, at the display panel PNL of the narrower frame specification, too, the second optical element OD2 is not displaced from the position where the second optical element OD2 is opposed to the display panel PNL due to deformation or adhesive displacement, and leakage of light from a peripheral portion of the active area ACT can be suppressed.

In addition, the second optical element OD2 is separated from the display panel PNL or the counter-substrate CT. The air gap AG is set not to cause the second optical element OD2 and the display panel PNL to locally contact each other even if the second optical element OD2 or the display panel PNL is deformed. For this reason, inconvenience of display or degradation of appearance can be suppressed. In addition, even when the second optical element OD2 is deformed or when stress forwarding the display panel PNL is applied to the cover member CB from the outside, the stress is not directly applied to the display panel PNL. For this reason, the cell gap can be uniformly maintained in the active area ACT of the display panel PNL, and occurrence of irregularity in display can be suppressed.

FIG. 5 is a cross-sectional view schematically showing another structural example of the display device DSP comprising the display panel PNL shown in FIG. 1.

The structural example shown in FIG. 5 is different from the structural example in FIG. 4 with respect to a feature that the second optical element OD2 is in contact with the display panel PNL. However, the structural example is the same as the structural example shown in FIG. 4 with respect to a feature that the second optical element OD2 is not bonded to the display panel PNL, but is free from the display panel PNL. Explanation of the other structural elements is omitted since they are the same as those of the structural example shown in FIG. 4.

In the structural example, the same advantages as those of the above-described structural example can be obtained, and the display device DSP can be thinned according to omission of the air gap.

Incidentally, an example of a method of manufacturing the cover member CB integral with the second optical element OD2 will be hereinafter described with reference to FIG. 6.

First, an optical element LOD is bonded to a main surface MA of a large cover member (mother substrate) LCB as shown in FIG. 6(a). After that, the cover member LCB and the optical element LOD are cut together to take the single cover member CB integral with the optical element OD, as shown in FIG. 6(b). At this time, the outer edge CBE of the cover member CB overlaps the outer edge ODE of the optical element OD along the entire periphery. In other words, the cover member CB and the optical element OD are of the same size, and are layered, and one of them does not extend over the other. The single cover member CB integral with the optical element OD is formed to have a larger size than the outer dimensions of the display panel PNL.

Subsequently, after the display panel PNL is contained in the casing FR, the optical element OD or the cover member CB is fixed to the casing FR such that the optical element OD is opposed to the entire surface of the display panel PNL, without bonding the optical element OD to the display panel PNL, as shown in FIG. 6(c). At this time, the optical element OD is separated from the display panel PNL, in the example shown in the figure. However, the optical element OD may be in contact with the display panel PNL, similarly to the example shown in FIG. 5.

In the manufacturing method, the cover member CB comprising the optical element OD extending over the entire surface of the inner surface CBA can be formed in a simple manufacturing process.

Figure 7:
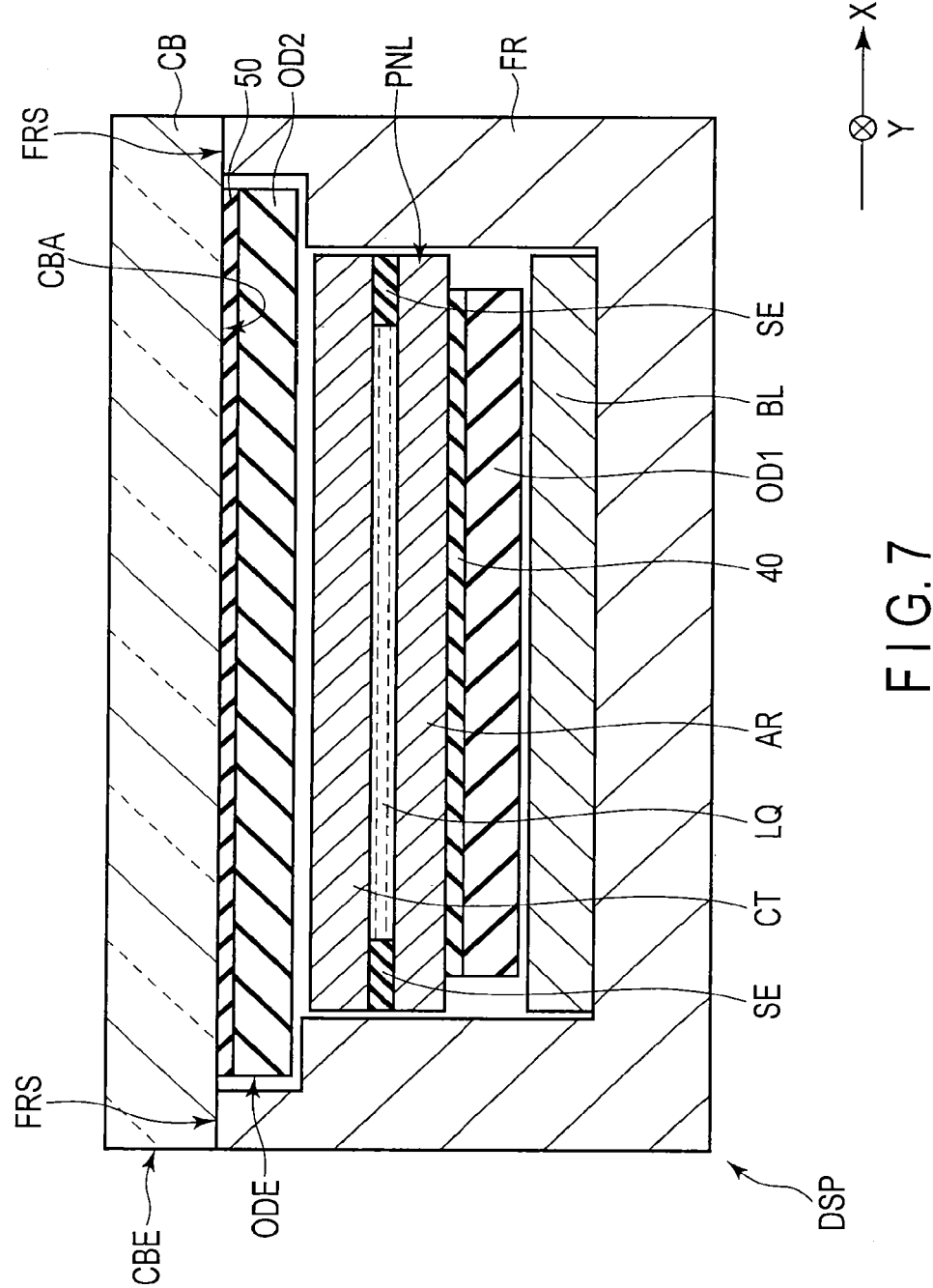
FIG. 7 is a cross-sectional view schematically showing yet another structural example of the display device DSP comprising the display panel PNL shown in FIG. 1.

FIG. 7 is a cross-sectional view schematically showing yet another structural example of the display device DSP comprising the display panel PNL shown in FIG. 1.

The structural example shown in FIG. 7 is different from the structural example in FIG. 4 with respect to a feature that the casing FR supports the cover member CB.

In other words, the second optical element OD2 is bonded to the inner surface CBA of the cover member CB by the adhesive 50. The second optical element OD2 is formed to be larger than the outer dimensions of the display panel PNL. However, the outer edge CBE of the cover member CB does not overlap the outer edge ODE of the second optical element OD2, but is positioned outwardly from the outer edge ODE. In other words, a peripheral portion of the inner surface CBA of the cover member CB is not bonded to the second optical element OD2, but is exposed from the second optical element OD2. The support surface FRS of the casing FR supports the cover member CB. For example, the cover member CB is bonded to the support surface FRS.

The cover member CB integral with the second optical element OD2 is thereby fixed to the casing FR. The structural example is the same as the structural example shown in FIG. 4 with respect to a feature that the second optical element OD2 is not bonded to the display panel PNL, but is free from the display panel PNL. Explanation of the other structural elements is omitted since they are the same as those of the structural example shown in FIG. 4.

In the structural example, the same advantages as those of the above-described structural example can be obtained.

Next, a structural example of a display device DSP comprising a sensing element SD will be described. The sensing element SD is configured to detect a substance on the outer surface (detecting surface) CBB of the cover member CB as described above. The sensing element SD may have a function of detecting a substance by itself or may perform a function of detecting a substance in cooperation of lines and electrodes built in the display panel PNL as described above. As an example, the sensing element SD is electrically connected with a signal supply source mounted on the display panel PNL via a wiring board routed between the cover member CB and the casing FR.

FIG. 8 is a cross-sectional view schematically showing yet another structural example of the display device DSP comprising the display panel PNL shown in FIG. 1.

In the example shown in the figure, the sensing element SD is positioned between the display panel PNL and the second optical element OD2. The sensing element SD may be formed on the outer surface CTA of the counter-substrate CT or may be formed on the inner surface ODA of the second optical element OD2. If the sensing element SD is formed on the outer surface CTA, the sensing element SD and the display panel PNL are not bonded to the second optical element OD2. If the sensing element SD is formed on the inner surface ODA, the sensing element SD and the second optical element OD2 are not bonded to the display panel PNL. In addition, the sensing element SD may not be bonded to the outer surface CTA or the inner surface ODA.

In the structural example, too, the same advantages as those of the above-described structural example can be obtained.

Figure 9:
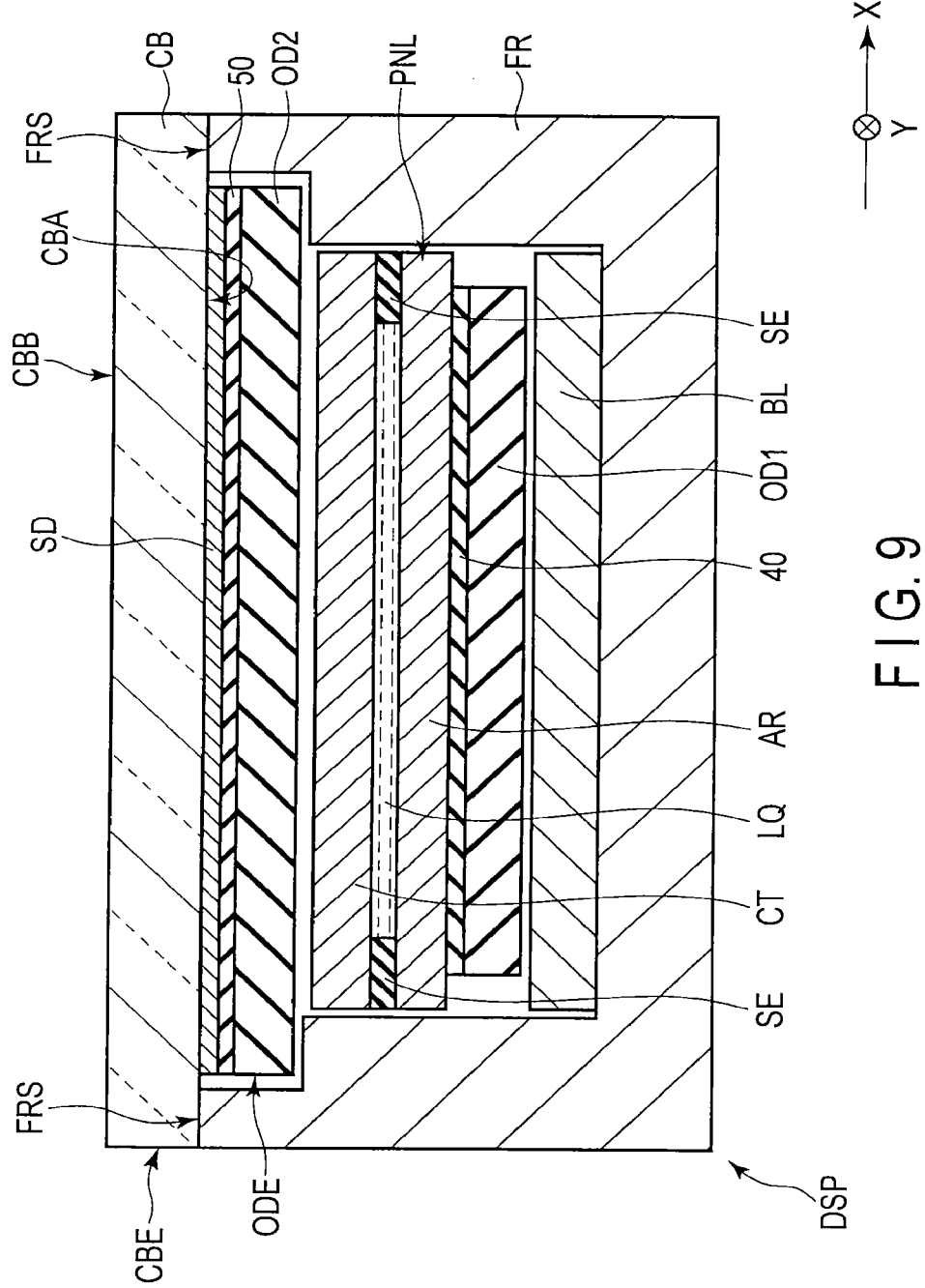
FIG. 9 is a cross-sectional view schematically showing yet another structural example of the display device DSP comprising the display panel PNL shown in FIG. 1.

FIG. 9 is a cross-sectional view schematically showing yet another structural example of the display device DSP comprising the display panel PNL shown in FIG. 1.

In the example shown in the figure, the sensing element SD is positioned between the cover member CB and the second optical element OD2. The sensing element SD is formed on the inner surface CBA of the cover member CB.

In the structural example, too, the same advantages as those of the above-described structural example can be obtained.

According to the present embodiment, as described above, the display device capable of suppressing the lowering of yields and the method of manufacturing the display device can be provided.

In the above-described embodiment, the liquid crystal display device has been explained as an example of the display device. However, the display device of the present embodiment may be an organic EL display device in which a display panel comprises organic EL elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a display panel including a first substrate having switching elements, and a second substrate opposed to the first substrate;
   a cover glass positioned at a front surface side of the display panel; and
   an optical element including a polarizer, and positioned between the second substrate and the cover glass,
   wherein the optical element is bonded to an inner surface of the cover glass, and is not bonded to the second substrate at least in a display area, the optical element is in physical contact with the second substrate, and
   the cover glass extends beyond all end portions of the display panel.

2. The device of claim 1, wherein the optical element includes a retardation film.

3. The device of claim 1, further comprising a casing containing the display panel.

4. The device of claim 1, further comprising a backlight positioned at a rear surface side of the display panel.

5. The device of claim 1, further comprising a sensor configured to detect a substance on an outer surface of the cover glass.

6. The device of claim 5, wherein the sensor is positioned between the second substrate and the optical element.

7. The device of claim 5, wherein the sensor is positioned between the optical element and the cover glass.

8. The device of claim 1, wherein the optical element is larger than outer dimensions of the display panel.

9. The device of claim 3, wherein
   the casing includes a bottom surface and a support surface,
   the first substrate, the second substrate, and the cover glass are arranged on the bottom surface in this order, and
   the cover glass is bonded to the support surface.

10. The device of claim 1, wherein an air gap does not exist between the optical element and the second substrate.

11. The device of claim 1, wherein an adhesive does not exist between the optical element and the second substrate.

* * * * *